United States Patent
Hinton et al.

(10) Patent No.: US 9,081,688 B2
(45) Date of Patent: Jul. 14, 2015

(54) OBTAINING DATA FOR REDUNDANT MULTITHREADING (RMT) EXECUTION

(75) Inventors: Glenn J. Hinton, Portland, OR (US); Steven E. Raasch, Shrewsbury, MA (US); Sebastien Hily, Hillsboro, OR (US); John G. Holm, Beaverton, OR (US); Ronak Singhal, Portland, OR (US); Avinash Sodani, Portland, OR (US); Deborah T. Marr, Portland, OR (US); Shubhendu S. Mukherjee, Southborough, MA (US); Arijit Biswas, Holden, MA (US); Adrian C. Moga, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1269 days.

(21) Appl. No.: 12/317,801

(22) Filed: Dec. 30, 2008

(65) Prior Publication Data

US 2010/0169582 A1 Jul. 1, 2010

(51) Int. Cl.
G06F 12/08 (2006.01)

(52) U.S. Cl.
CPC ........ G06F 12/0842 (2013.01); G06F 12/0817 (2013.01)

(58) Field of Classification Search
CPC .......................... G06F 12/0815–12/0842; G06F 12/08–12/0897; G06F 11/16–11/2051
USPC .................................................. 711/141–146
See application file for complete search history.

(56) References Cited

U.S. PATENT DOCUMENTS

| | | | | |
|---|---|---|---|---|
| 5,291,442 | A * | 3/1994 | Emma et al. | 711/120 |
| 5,895,487 | A * | 4/1999 | Boyd et al. | 711/122 |
| 5,897,655 | A * | 4/1999 | Mallick | 711/134 |
| 6,571,204 | B1 * | 5/2003 | Meyer | 703/22 |
| 6,792,525 | B2 | 9/2004 | Mukherjee et al. | |
| 7,353,365 | B2 | 4/2008 | Mukherjee et al. | 712/218 |
| 7,849,387 | B2 | 12/2010 | Biswas et al. | |
| 2001/0034827 | A1 * | 10/2001 | Mukherjee et al. | 712/225 |
| 2002/0023202 | A1 | 2/2002 | Mukherjee | |
| 2005/0050386 | A1 * | 3/2005 | Reinhardt et al. | 714/13 |
| 2006/0095821 | A1 * | 5/2006 | Mukherjee et al. | 714/736 |
| 2007/0277023 | A1 | 11/2007 | Weiberie et al. | |
| 2008/0040551 | A1 * | 2/2008 | Gray et al. | 711/130 |
| 2008/0059765 | A1 * | 3/2008 | Svendsen et al. | 712/34 |
| 2008/0282116 | A1 | 11/2008 | Wang et al. | |

OTHER PUBLICATIONS

Shubhendu S. Mukherjee, et al., "Detailed Design and Evaluation of Redundant Multithreading Alternatives," 2002, pp. 1-12.
Mohamed A. Gomaa, et al, "Opportunistic Transient-Fault Detection," 2005, pp. 1-12.
Angshuman Parashar, et al., "SlicK: Slice-based Locality Exploitation for Efficient Redundant Multithreading," 2006, pp. 1-11.

(Continued)

*Primary Examiner* — Aimee Li
*Assistant Examiner* — Nicholas Simonetti
(74) *Attorney, Agent, or Firm* — Trop, Pruner & Hu, P.C.

(57) ABSTRACT

In one embodiment, the present invention includes a method for providing a cache block in an exclusive state to a first cache and providing the same cache block in the exclusive state to a second cache when cores accessing the two caches are executing redundant threads. Other embodiments are described and claimed.

15 Claims, 5 Drawing Sheets

(56) References Cited

OTHER PUBLICATIONS

U.S. Appl. No. 12/317,802, filed Dec. 30, 2008 entitled "Controlling Non-Redundant Execution in a Redundant Multithreading (RMT) Processor," by Glenn J. Hinton, et al.
U.S. Patent and Trademark Office, Office Action mailed Apr. 6, 2011 and Reply filed on Jul. 5, 2011 in U.S. Appl. No. 12/317,802.
M. Rashid, et al., "Exploiting Coarse-Grain Verification Parallelism for Power-Efficient Fault Tolerance," 2005, pp. 1-11.
U.S. Patent and Trademark Office, Final Office Action mailed Sep. 7, 2011 with Request for Continuing Examination filed on Dec. 6, 2011 in U.S. Appl. No. 12/317,802.
U.S. Patent and Trademark Office, Office Action mailed Aug. 8, 2012, with Reply filed Dec. 6, 2012 in U.S. Appl. No. 12/317,802.

* cited by examiner

OBTAINING DATA FOR REDUNDANT MULTITHREADING (RMT) EXECUTION

BACKGROUND

Modern processors are vulnerable to transient faults caused by strikes from alpha particles and cosmic radiation. These faults may lead to errors in the processor's operation, known as "soft" errors since they do not reflect a permanent malfunction of the device. Strikes by cosmic ray particles, such as neutrons, are particularly noteworthy because of the absence of any practical way to protect from such strikes. The rate at which processor soft errors occur is referred to as the soft error rate (SER). Note that it is possible for some errors to corrupt data without the error being detected. The rate at which these events occur is referred to as the silent data corruption (SDC) rate.

The failure rate of a circuit is related to both the size of the transistors and the circuit supply voltage. As transistors shrink in size with succeeding technology generations, they become individually less vulnerable to cosmic ray strikes. However, this size reduction is usually accompanied by a reduction in supply voltage which increases susceptibility. Overall, decreasing voltage levels and exponentially increasing transistor counts cause chip susceptibility to increase rapidly. Additionally, error rates (measured in failures per unit time) are additive, which means that achieving a particular failure rate for a multiprocessor server requires a correspondingly lower failure rate for its associated individual processors. While possible solutions to such increasing error rates include making processor circuits less susceptible to errors, such circuit techniques cannot alleviate the problem totally, and it adds to the cost and complexity.

Similarly, fault detection support can reduce a processor's SDC rate by halting computation before faults can propagate to permanent storage. Parity, for example, is a well-known fault detection mechanism that eliminates SDC for single bit upsets in memory structures. Unfortunately, adding parity to latches or logic in a high-performance processor can adversely affect its cycle time and overall performance. Additionally, adding such codes to random logic is not straightforward and current design tools do not support such an option.

Consequently, designers have resorted to redundant execution mechanisms to detect such faults in a processor. One such mechanism is lockstepping, in which multiple cores are allocated for each program, consuming resources that could otherwise be used to boost performance, particularly in a multithreaded environment. By its very nature, both lockstepped processor cores must perform the same operation in lockstep. For example, both processors must suffer a cache miss latency or branch misprediction in lockstep, so that a checker, which checks the results generated by the lockstepped cores, does not see an output mismatch.

To make more efficient use of processor resources, another technique called Redundant Multithreading (RMT) has been proposed. RMT detects faults by running two copies of the same program as separate threads in a single core, feeding them identical inputs, and comparing their outputs. A basic RMT implementation still suffers from complexity and efficiency issues.

DETAILED DESCRIPTION

Different implementations of RMT may be realized. In one implementation, a simultaneous and redundantly threaded processor (SRT) may use a single simultaneous multithreaded (SMT) processor provided with fault detection support. In SRT, the data and address portions of store instructions and the address of load instructions (and a number of other selected instructions) from the redundant threads are compared for output mismatches. The system attempts to keep one thread (the leading thread) ahead of the other (the trailing thread) by a certain number of instructions (the slack), which may be in the hundreds of instructions. Input replication of load values can be achieved by forwarding data from retired loads in the leading thread to the corresponding loads in the trailing thread using a load value queue (LVQ), which is a buffer within the processor. As will be described further below, embodiments may provide for cross-thread memory access directly from the memory hierarchy, avoiding the need for a LVQ or other dedicated processor storage for redundant values.

SRT thus uses processor resources more efficiently than lockstepping because the trailing thread does not suffer any cache misses (instead it gets its load values from the load value queue) or branch mispredictions (as the branch prediction table is correctly updated by the leading thread before the trailing thread accesses the table).

In other implementations of the RMT model, referred to as chip-level redundant threading (CRT) a chip multiprocessor formed of individual processors can be used to support fault detection. As in SRT, CRT uses loosely synchronized redundant threads, enabling lower checker overhead and eliminating cache miss and misspeculation penalties on the trailing thread. As in lockstepping, the two redundant thread copies may execute on separate processor cores; they are not multiplexed as different thread contexts on a single core as in SRT.

In some implementations for multithreaded workloads, a CRT "cross-couples" cores for greater efficiency. For example, with two application threads, each core runs the leading thread for one application and the trailing thread for the other. Embodiments may provide significantly higher performance compared to lockstepping by using SMT to take advantage of underutilized processor resources. The resources freed up by CRT on each core by optimizing one application's trailing thread can then be applied to the more resource-intensive leading thread of a different application.

Figure 1:
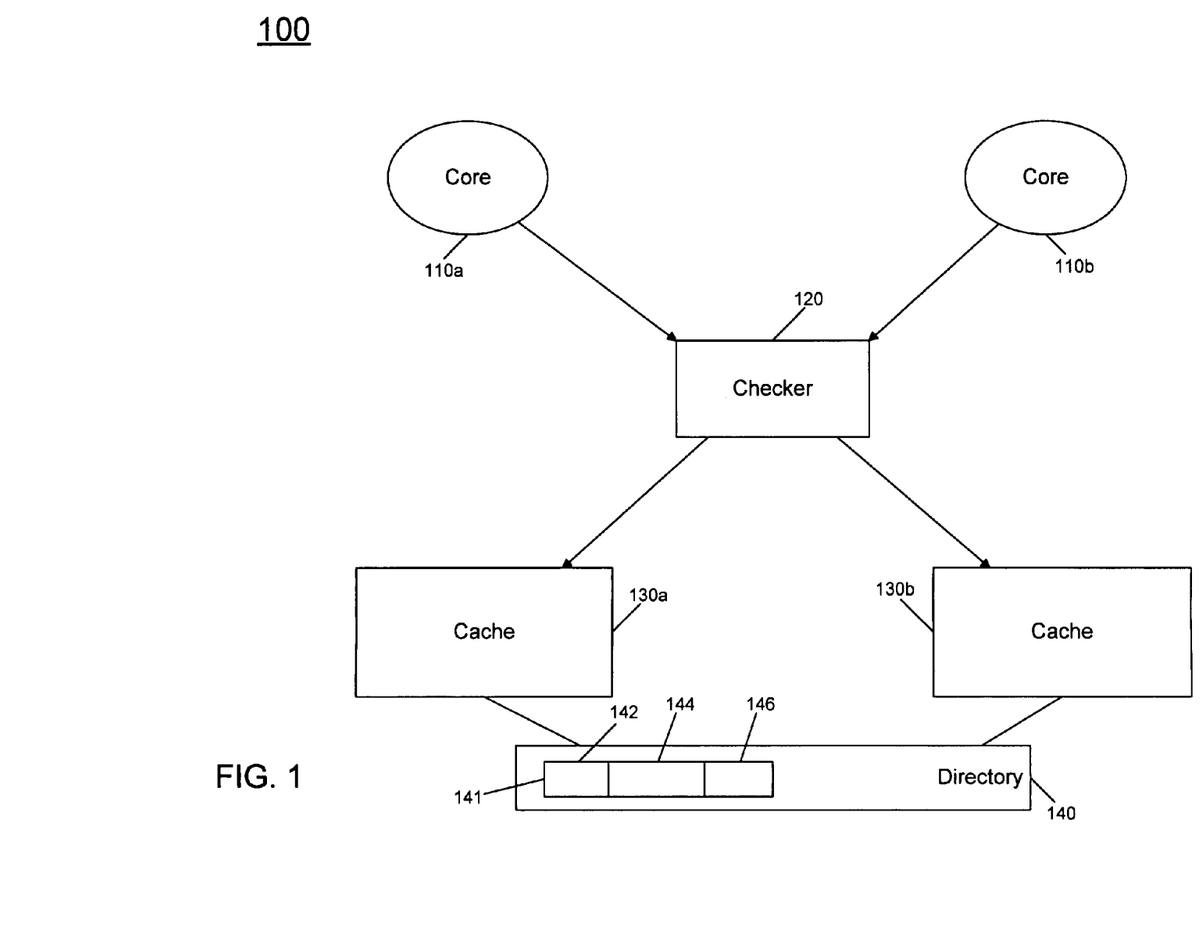
FIG. 1 is a block diagram of a redundant multithreading (RMT) system in accordance with one embodiment of the present invention.

Referring now to FIG. 1, shown is a block diagram of a RMT processor in accordance with one embodiment of the present invention. As shown in FIG. 1, processor 100 may be a multi-core processor including two or more cores $110_a$-$110_b$ (generically core 110). While not shown, understand that in some implementations each core may have a private cache associated therewith. To perform CRT, each core 110 may execute redundant instructions in the form of a leading thread and a trailing thread. For purposes of discussion, assume that the leading thread of an application is executed on core $110_a$ and the trailing thread on core $110_b$. During redundant execution, both cores will execute the same instructions. To ensure the correct execution, the results of at least certain instructions such as store instructions may be checked in a checker 120. While the scope of the present invention is not limited in this regard, in some implementations checker 120 may be implemented in a retirement stage of processor 100 in a memory order buffer (MOB) or other such structure. If an error is indicated, such as where the same instruction results in two different values from the different cores, then an exception or other error indication may be raised. When instead the redundant execution results in the same value, that value can be written to a memory hierarchy.

In the embodiment shown in FIG. 1, that memory hierarchy may include caches $130_a$ and $130_b$, each associated with one of cores 110. In the embodiment of FIG. 1, caches 130 (generically) each may be a private cache associated with a given core. As will be described further below, in some implementations both values generated in the cores can be written back to caches 130. Such dual-writer ability allows for more efficient operation, as otherwise one of the cores would not be allowed to write its data results back to cache memory 130, since conventional cache coherency protocols do not allow for one block to be writable by two caches.

As further shown in FIG. 1, a directory 140 may be coupled to cache memories 130. Directory 140 may include various information associated with cache blocks stored in cache memories 130, such as the location of the cache blocks, as well as the state of such cache blocks. Directory 140 may be thus used to handle a given cache coherency protocol and to generate messages to the caches to maintain the appropriate state of the cache blocks. In turn, directory 140 may be coupled to other levels of a memory hierarchy, such as an additional cache level or main memory.

As shown in FIG. 1, directory 140 may include a plurality of entries 141. Each entry may be associated with a given cache block and may include various information such as a tag field 142 to identify a location of the corresponding cache block in one of caches 130. A status field 144 may include various status information associated with the cache block such as a valid indicator or so forth. Still further, a state field 146 may identify a state of the cache block. As will be discussed further below, such state may be one of multiple states of a given cache coherency protocol. One such state of the protocol may provide for dual-writer access, also referred to herein as a shared-exclusive state. While shown with this particular implementation in the embodiment of FIG. 1, the scope of the present invention is not limited in this regard.

As mentioned above, embodiments may be used to aid in handling input replication of load values for RMT implementations. To ensure that both redundant threads are following the same execution path of committed instructions, inputs coming into the threads such as load values are to be replicated appropriately and delivered at the correct instruction point to each thread. If the two threads pick up different values for the same load (perhaps because of a weak memory consistency model), the two threads may follow divergent paths.

Accordingly, in various embodiments during redundant execution, the input replication function for normal load operations can be met by allowing loads from both the primary and redundant threads to access the cache hierarchy, which may be referred to as independent memory access (IMA). A detection and recovery mechanism may be implemented to ensure that a change to a value in the memory system prior to that value being read by the second load operation does not cause the two threads to use different load values. Note that IMA may not be appropriate for uncached loads.

In accordance with embodiments, independent memory access may be realized by using the memory system to perform replication. That is, a first (e.g., leading) thread will load a needed value from the memory system and store that value in a cache. Then, when a second thread acts to independently obtain the value, it will seek the value from the cache, and thus the replication occurs in the cache (if the value is present in the core). It is possible though, that the value is not present. For example, assume a long slack between the threads. In this case, the first thread will obtain the value from memory and store it in the cache, where it remains for some time before it is evicted. Then when the second thread tries to obtain the value from the cache, and it is not present, the request traverses back to memory to obtain the value for the second thread. Thus in this case the point where the value has been split or provided to the two threads is actually in memory, not in the cache.

Thus even after a load of the primary or leading thread retires, it continues to stay in an ordering buffer such as a memory order buffer (MOB) as a "senior load." A senior load is a load that has already committed to the architectural state of the processor (e.g., has been written into a register) and by definition has already come back from the memory system, and thus is a post-commit entry. While generally referred to as a MOB, embodiments may provide support for storage of both load and store values, e.g., via a combined MOB or separate load and store buffers. A senior load leaves the MOB if the corresponding second load from the redundant thread shows up and retires. In this case, the corresponding load also probes the data cache and can obtain its value from the cache to avoid traversing the memory hierarchy.

Note that the MOB is part of a core, not part of the memory system. A load is placed in the load buffer and is sent off to memory. When the value comes back from memory it is matched up with the entry in the load buffer. The entry helps to maintain information on where that value is to be used. In one embodiment, the load buffer may store a load address, destination register number, and other bookkeeping information.

While a senior load is present in the MOB, it can be hit (matched) by an external snoop request. If a senior load is hit by a snoop, indicating that the data corresponding to the load value could get modified, the redundant thread is stopped and a resynchronization operation is performed. The resynchronization process causes the state of the primary thread to be copied to the redundant thread; the redundant thread then resumes execution with this new state.

A load-guarding function uses a snoop detection mechanism (where incoming snoops are matched against the contents of a load buffer) to indicate that memory contents may be changed between the execution of the first and last loads. In order to keep the first load value in the load buffer (so that it can act as a "target" for incoming snoops), embodiments may mark the value as a "senior" load at retirement. In this way, the load value is allowed to remain in the load buffer until the second load has retired. When the second load retires, both loads are deallocated from the load buffer. In contrast, conventional load buffer implementations simply deallocate a load's entry when it retires and also trigger a nuke operation on the thread that saw the snoop hit a load-buffer entry.

Figure 2:
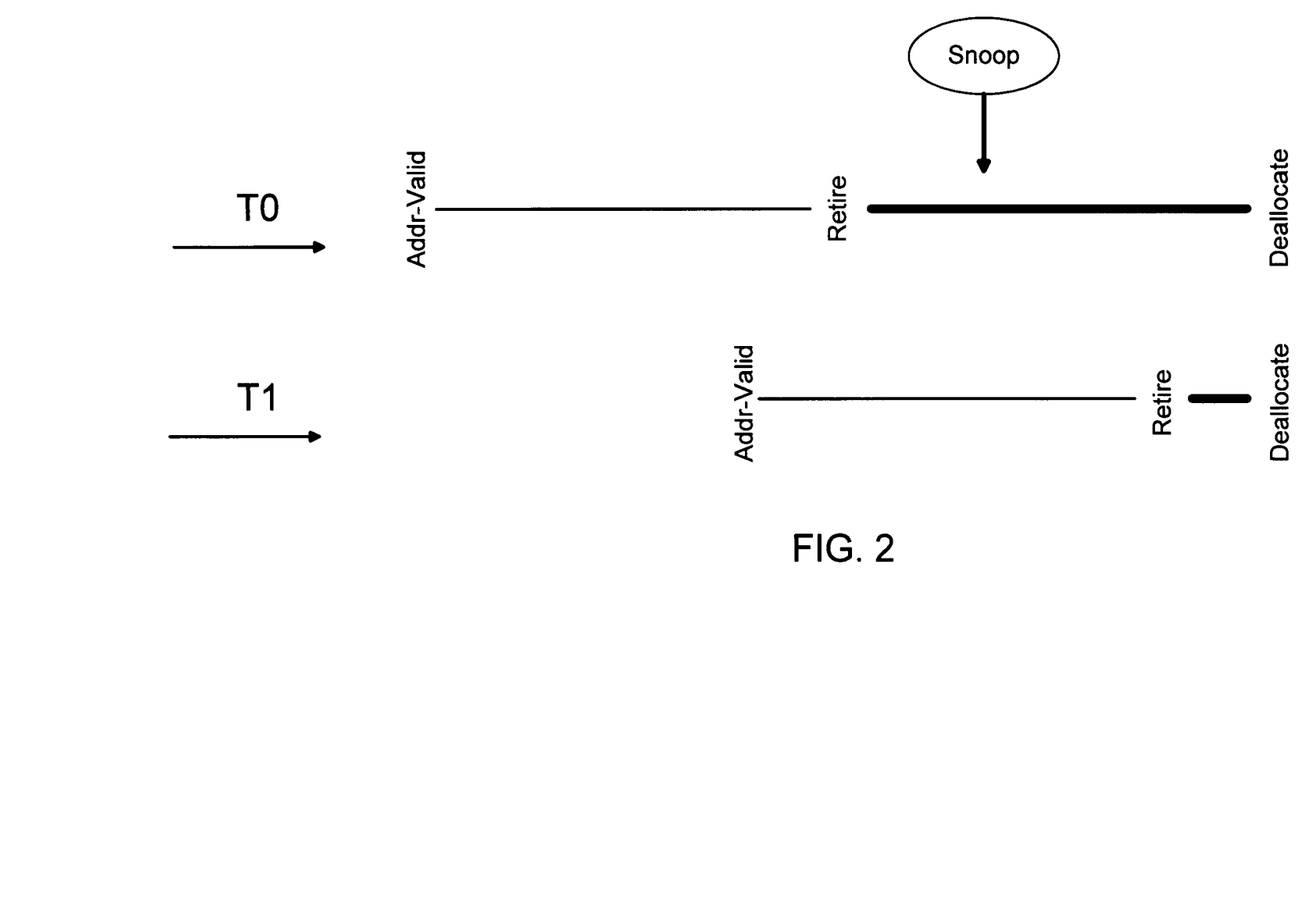
FIG. 2 is a timeline diagram of redundant execution in first and second threads in accordance with one embodiment of the present invention.

Referring now to FIG. 2, shown is a timeline diagram of redundant execution in first and second threads in accordance with one embodiment of the present invention. As shown in FIG. 2, thread 0 (T0) is the leading thread, and retires its load earlier than thread 1 (T1) does. At retirement, the T0 load is marked "senior" (heavy line) and serves as a target for incoming snoops. The load instruction has left the pipeline, and the only remnants in the core itself is this entry in the load buffer. If a snoop hits this senior load entry, the load buffer makes an annotation to the entry. When T1 attempts to retire and a snoop has occurred to that entry, T1 clears its operations, and a synchronization from thread 0 to thread 1 occurs. In various implementations, a snoop-hit to a senior load will not cause a nuke, but rather cause the redundant thread to re-synchronize with the primary thread.

If the senior load that was hit by the snoop was a part of the primary thread, this indicates that the redundant thread was trailing the primary thread, and would have received a different load value. After the resynchronization, the redundant thread's execution jumps forward to match the primary thread and it proceeds to execute with the value received by the primary thread.

In the situation where the senior load was part of the redundant thread, this indicates a trailing primary thread that had not retired the load value. In this case, the primary thread will receive the value after the snoop. After the resynchronization, the redundant thread's execution is rolled back to the point before the load executed; now, both threads will execute the load, and receive the same value that is available after the snoop. Note that when executing the primary thread T0 to obtain that load data again, the data may be differently valued because it has been modified by another agent.

Figure 3:
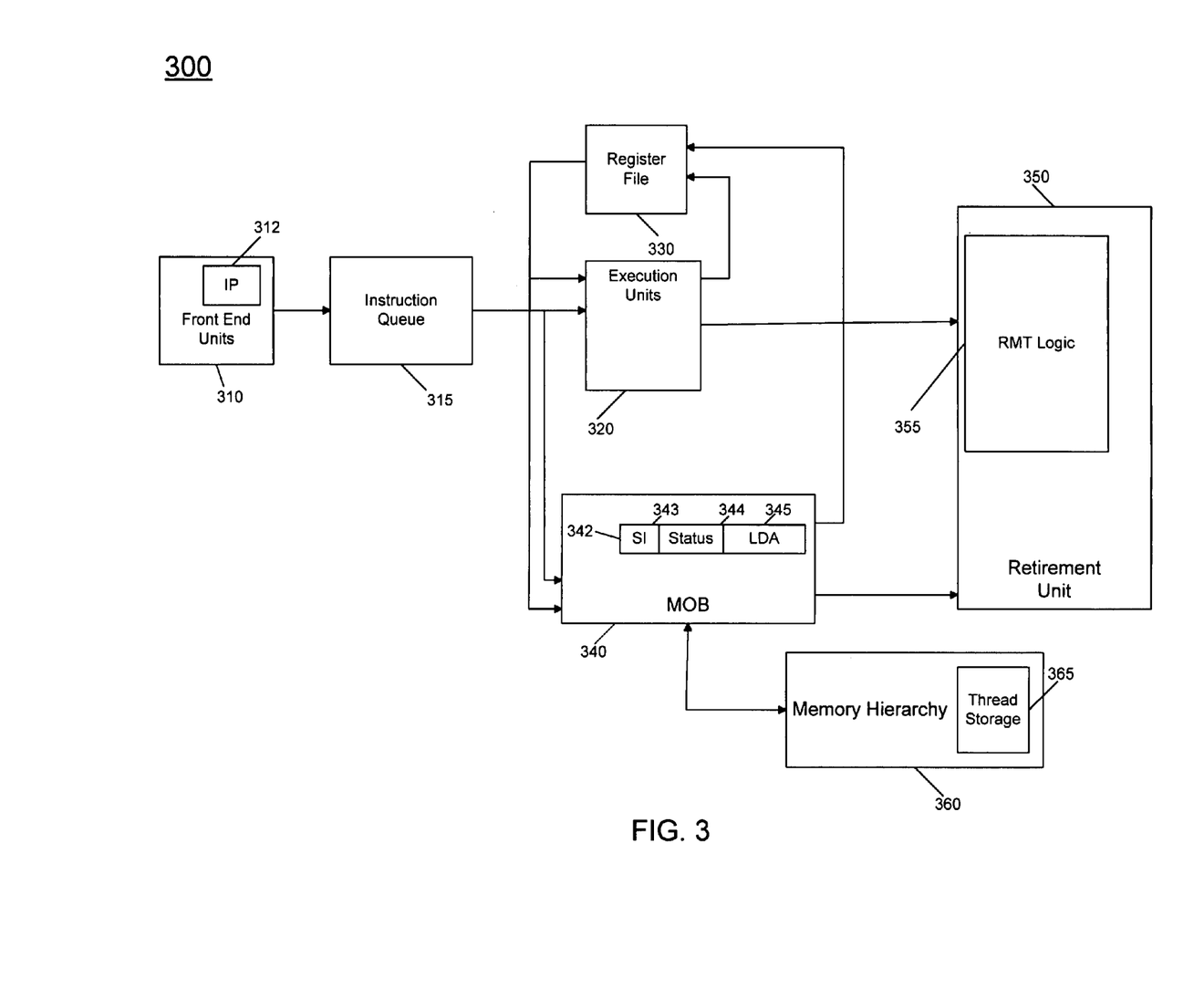
FIG. 3 is a block diagram of a processor in accordance with one embodiment of the present invention.

Referring now to FIG. 3, shown is a block diagram of a processor in accordance with one embodiment of the present invention. As shown in FIG. 3, processor 300 may be a multi-stage pipelined out-of-order processor, although embodiments may equally be used with an in-order processor. Processor 300 is shown with a relatively simplified view to illustrate various features used in connection with independent memory access as described above. As one example, only a single core is shown in the embodiment of FIG. 3, although there may be multiple cores similarly adapted.

As shown in FIG. 3, processor 300 includes front end units 310, which may be used to fetch macro-instructions to be executed and prepare them for use later in the processor. Such fetching may be based on an instruction pointer (IP) of the hardware thread. In various embodiments, each hardware thread may store its IP in a storage 312 of front-end units 310. For example, front end unit 310 may include an instruction prefetcher, an instruction decoder, and a trace cache, along with micro-code storage as well as a micro-operation (µop) storage. The instruction prefetcher may fetch macro-instructions from memory and feed them to an instruction decoder to decode them into primitives, i.e., µops for execution by the processor. The trace cache may take decoded µops and assemble them into program ordered sequences for storage into the macro code storage.

Coupled between front end units 310 and execution units 320 is an instruction queue 315 that may be used to receive the micro-instructions and store them prior to execution. In one embodiment, instruction queue 315 may include various buffers to re-order micro-instruction flow and allocate various resources needed for execution, as well as to provide renaming of logical registers onto storage locations within various register files such as register file 330, which may include separate register files for integer and floating point values. When a given redundant thread is executing, its register values may be stored in register file 330. Various resources may be present in execution units 320, including, for example, various integer, floating point, and single instruction multiple data (SIMD) logic units, among other specialized hardware.

A memory order buffer (MOB) 340 may include control logic, a load buffer, a store buffer, and the like. As shown in the embodiment of FIG. 3, MOB 340 may include various entries 342 each including information associated with a given load or store value. In the embodiment shown in FIG. 3, entry 342 is associated with a load operation and includes an address field 345 to provide an indication of an address associated with the load operation, a status field 344 which may include various information associated with the instruction, such as its completion status, validity and so forth. In addition, a senior field 343 may be present to store an indicator, e.g., a senior load bit, to indicate that the associated load operation of a primary thread has already committed. The information from various entries in MOB 340 may be used by a retirement unit 350. While shown as a separate unit in the embodiment of FIG. 3, understand that in various implementations a retirement stage may generally include both the logic of retirement unit 350 as well as the structures of MOB 340.

In the embodiment shown in FIG. 3, retirement unit 350, which may be used to retire instructions after they have executed, may include a RMT logic 355. Logic 355 may be used to control entry into and exit from redundant mode. For example, if a snoop hit occurs to a senior load in MOB 340, RMT logic 355 may cause re-synchronization between the multiple threads before allowing continued operation of redundant mode.

As further shown in FIG. 3, a memory hierarchy 360 may be coupled to MOB 340, as shown in FIG. 3. The memory hierarchy may include both on-chip cache as well as an off-chip cache memory, a system memory such as a dynamic random access memory (DRAM), and mass storage such as a hard drive.

As further shown in FIG. 3, memory hierarchy 360 may store at least a part of the hardware thread contexts for the redundant threads. Specifically as shown in FIG. 3, a portion 365 of cache memory 360 may store the memory values for the redundant threads.

Embodiments can be applied to multi-core RMT or CRT implementations in which the redundant thread can be performed on a different core as aided by a cache coherence protocol in accordance with an embodiment of the present invention. Typically, a cache coherency protocol such as the modified-exclusive-shared-invalid (MESI) protocol supports a single-writer invalidation, which allows only one writeable (i.e., exclusive) copy of a cache block. This poses a challenge to a multi-core RMT implementation because both redundant copies would seek exclusive access to the same cache block. To avoid this, only one of the redundant threads may gain exclusive access to the block and other thread can discard its value after the output comparison of the store in question. However, a performance penalty may occur, since the next time there is a load to that address, the thread discarding the store would have to incur a cache miss and read the cache block back into its cache.

Instead, using a cache coherency protocol in accordance with an embodiment of the present invention, both threads can gain exclusive access to the cache block, so that both threads can write to their individual caches, i.e., via a multiple-writer protocol. Only one of the threads (which can be pre-designated) can, however, write back dirty data back into a larger cache or memory system.

As described, a coherence protocol may be implemented using the following MESI states: M for modified, E for exclusive, S for shared, and I for invalid. In a typical MESI protocol, a cache block usually starts out in the I state. A read request fills and moves the block from I to S state. Similarly, a write request will move the block from I to E state. When the block is written to while in the E state, the block changes to the M state. These state transitions take place in the cache and may be performed by a cache controller or other logic associated with the cache. If there is a directory protocol (instead of a pure broadcast-based snoop) in the system, then the directory also goes through similar state transitions with some modifications. When a block is first filled into a cache it can be in either the E state or S state (depending on implementation and whether the fill was intended for use for a store). When another cache in the system requests the block for reads, it transitions into a shared state S. As more caches continue to request the block for reads, the block remains in the shared state S in the directory. Depending on the implementation, the directory can either capture precise identities of each sharer or merge them into a superset of sharers. If a cache requests write access, the directory invalidates all other cache blocks (these cache blocks transition from S to I). Then, the directory transitions the block into exclusive state E and records the identity of the exclusive cache owner. The block in the cache then transitions to the E state. Depending on the optimizations introduced in the directory, there can be numerous transient states that the directory blocks have to go through.

To allow a multi-writer protocol, a state referred to as a shared-exclusive or X state may be provided, e.g., at the directory side. This state may be represented by an indicator bit of a state field of the directory, in some implementations. When the first writer asks for exclusive access, the directory returns the block in the exclusive state. When the second writer asks for exclusive access, if this writer is known to be the redundant partner to the first writer, the directory marks the block in the directory as being in the X state and sends the cache block to the second writer, which marks it as in the exclusive state in its cache. In this way, the redundant core can write new generated data into its cache, thereby avoiding a costly refetch from the system. In some implementations, since directory state bits may be at a premium, the directory can decode the identity of the redundant pairs from cache identifiers (IDs) that indicate which caches are associated with the redundant threads. Or a directory may store such a mapping in a register at boot time. Alternatively, the directory can broadcast an invalidation to selected or all processor caches on a read request to an exclusive copy, so that the directory need not maintain the X state explicitly. In one implementation, a mask can be sent with the broadcast so that the individual caches determine from the mask whether a cache copy should be invalidated. Any of these implementations may be used, so long as the cache coherency protocol allows two writers to maintain a copy of the same cache block in exclusive state and send invalidating to all caches when a different processor (other than the two redundant ones involved) requests a copy of the block in shared or exclusive state. While described for ease of illustration as a dual-writer scheme, embodiments can be extended for a triply (or more)-redundant system in which three (or more) caches may need write access to the same block.

Figure 4:
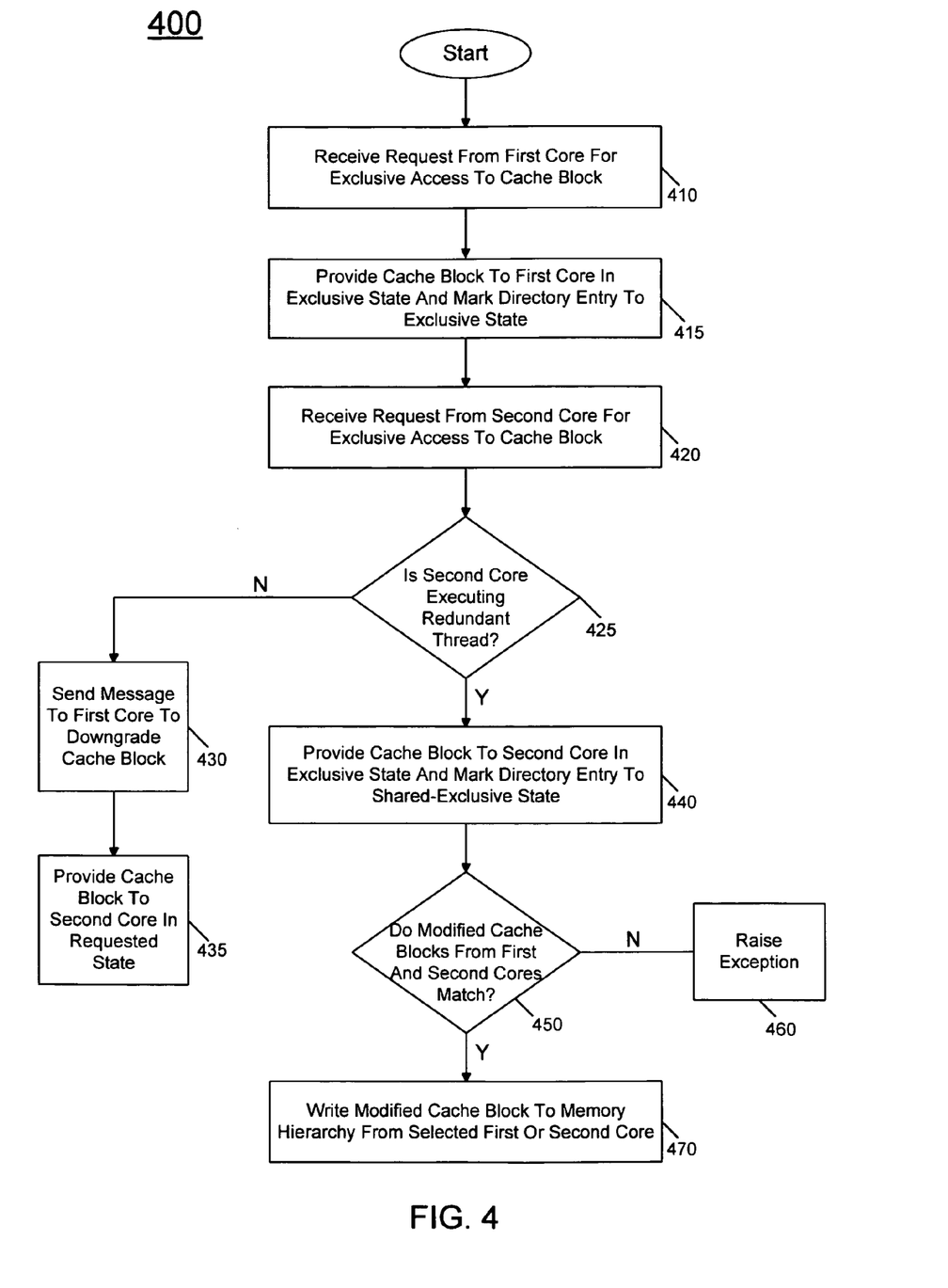
FIG. 4 is a flow diagram of a method in accordance with one embodiment of the present invention.

Referring now to FIG. 4, shown is a flow diagram of a method in accordance with one embodiment of the present invention. Specifically, FIG. 4 shows a method for handling dual-writer access to a cache block to enable efficient redundant mode execution. As shown in FIG. 4, method 400 may begin by receiving a request from a first core for exclusive access to a cache block (block 410). Note that while the terminology used here is with regard to cores, understand that requests for and providing of cache blocks may be to a cache associated with a core rather than a core directly. In various embodiments in which a directory-based mechanism is used, this request may be received by the directory. Responsive to this request, the directory may provide the cache block to the first core in an exclusive state (block 415). Still further, the directory may mark an entry corresponding to the cache block to the exclusive state. As discussed above, this marking may be by way of setting a state field of the directory entry accordingly.

Referring still to FIG. 4, assume that at a later time, the directory receives another request for exclusive access to this cache block, this time from a second core (block 420). Upon receipt of such request, the directory may determine whether the second core is executing a redundant thread to the thread that is executing on the first core (diamond 425). As discussed above, various manners of determining whether the cores are executing redundant threads can be realized. If redundancy is not determined, control passes to block 430. There the directory may send a message to the first core to downgrade its cache block (block 430). Such message may depend on the requested access type from the second core. If the second core seeks read access, the message may be to change the state of the cache block in the first core to a shared state. If instead the requested access is for exclusive access, the message may be to cause the cache block to be placed into the invalid state. Next as shown in FIG. 4 the cache block may be provided to the second core in the requested state (block 435).

Referring still to FIG. 4, if instead at diamond 425 it is determined that the second core execution is redundant to that of the first core, control passes to block 440. At block 440, the cache block may by provided to the second core, also in the exclusive state. Still further, the directory may mark its entry for that cache block to the shared-exclusive state. In this way, both the first and second cores have exclusive concurrent access to the same cache block such that both cores can write an updated value to that cache block.

Later, when the instruction associated with the cache block is to retire, it may be determined whether the updated cache blocks from the two cores match (diamond 450). For example, this determination may be undertaken by a checker or other such logic, which may be part of a retirement stage of the processor. If the comparison is indicative of an error in one of the cores, an exception may be raised (block 460). Otherwise, if the modified cache values match, control passes to block 470 where the modified cache block can be written to a memory hierarchy from a selected one of the two cores. That is, only one such core is allowed to write the updated data to additional cache levels or to main memory. In some implementations, the selected core may be that associated with the primary thread, although the scope of the present invention is not limited in this regard.

Figure 5:
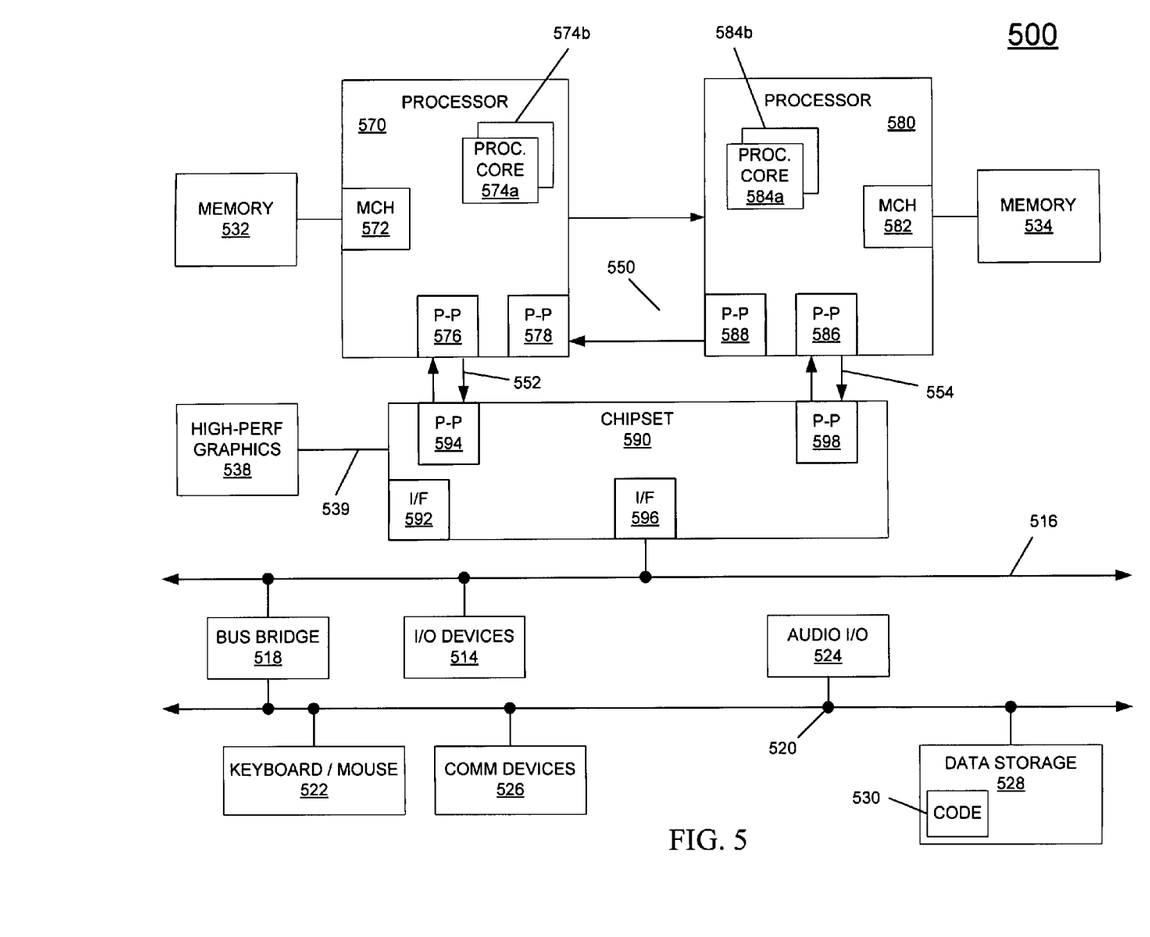
FIG. 5 is a block diagram of a system in accordance with an embodiment of the present invention.

Embodiments may be implemented in many different system types. Referring now to FIG. 5, shown is a block diagram of a system in accordance with an embodiment of the present invention. As shown in FIG. 5, multiprocessor system 500 is a point-to-point interconnect system, and includes a first processor 570 and a second processor 580 coupled via a point-to-point interconnect 550. As shown in FIG. 5, each of processors 570 and 580 may be multicore processors, including first and second processor cores (i.e., processor cores 574a and 574b and processor cores 584a and 584b). Each such processor may include private cache memories, including hardware, software and firmware to perform RMT according to embodiments of the present invention.

Still referring to FIG. 5, first processor 570 further includes a memory controller hub (MCH) 572 and point-to-point (P-P) interfaces 576 and 578. Similarly, second processor 580 includes a MCH 582 and P-P interfaces 586 and 588. As shown in FIG. 5, MCH's 572 and 582 couple the processors to respective memories, namely a memory 532 and a memory 534, which may be portions of main memory (e.g., a dynamic random access memory (DRAM)) locally attached to the respective processors. First processor 570 and second processor 580 may be coupled to a chipset 590 via P-P interconnects 552 and 554, respectively. As shown in FIG. 5, chipset 590 includes P-P interfaces 594 and 598.

Furthermore, chipset 590 includes an interface 592 to couple chipset 590 with a high performance graphics engine 538. In turn, chipset 590 may be coupled to a first bus 516 via an interface 596. As shown in FIG. 5, various I/O devices 514 may be coupled to first bus 516, along with a bus bridge 518 which couples first bus 516 to a second bus 520. Various devices may be coupled to second bus 520 including, for example, a keyboard/mouse 522, communication devices 526 and a data storage unit 528 such as a disk drive or other mass storage device which may include code 530, in one embodiment. Further, an audio I/O 524 may be coupled to second bus 520.

Embodiments may be implemented in code and may be stored on a storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
providing a cache block having a load value in an exclusive state to a first cache associated with a first core and marking an entry in a directory for the cache block to be in the exclusive state, the first core executing a first thread; and
providing the same cache block having the same load value in the exclusive state to a second cache associated with a second core and marking the entry to be in a shared-exclusive state while the cache block is in the exclusive state in the first cache, responsive to determining that the second core is executing a second thread that is a redundant thread to the first thread so that the first and second cores have exclusive concurrent access to the same cache block including the same load value and each can write an updated value to the same load value of the same cache block in the corresponding first and second caches, wherein if the second core is determined to not be executing the redundant thread downgrading the cache block in the first cache and providing the same cache block to the second cache in a requested state.

2. The method of claim 1, wherein marking the entry to be in the shared-exclusive state includes setting an indicator in the entry to reflect the shared-exclusive state.

3. The method of claim 1, further comprising storing first updated data for the cache block in the first cache and storing second updated data for the cache block in the second cache.

4. The method of claim 1, further comprising accessing a storage associated with the directory to determine that the first thread and the second thread are redundant.

5. The method of claim 1, wherein the directory is to send a message to the first cache to cause the state of the cache block to be shared or invalid if a third core seeks access to the cache block, wherein the third cache executes a non-redundant thread.

6. A system comprising:
a first processor to execute instructions of a first thread and having a first cache associated therewith;
a second processor to execute instructions of a second thread and having a second cache associated therewith, the second thread redundant to the first thread;
a directory coupled to the first and second caches to maintain cache coherency therebetween, wherein the directory is to allow both of the first and second caches to maintain a first cache block having same load data in an exclusive state responsive to a determination that the first and second processors are to execute the redundant threads, and to have exclusive concurrent access to the first cache block and to each write an updated value to the same load data of the first cache block in the corresponding first and second caches, and otherwise to not allow the maintenance of the first cache block in the exclusive state for both of the first and second caches, wherein the directory is to provide the first cache block in the exclusive state to the first cache and the second cache, mark an entry for the first cache block to be in the exclusive state when the first cache block is provided to the first cache and mark the entry to be in a shared-exclusive state when the first cache block is provided to the second cache while the first cache block is stored in the first cache, and to cause invalidation of the first cache block in the first and second caches and to provide the first cache block in the exclusive state to a third cache when a third processor including the third cache is to execute a non-redundant thread; and
a dynamic random access memory (DRAM) coupled to the directory.

7. The system of claim 6, wherein the directory includes a storage to store information to indicate that the first and second processors are to execute redundant threads.

8. The system of claim 6, wherein only a single one of the first and second caches is to write an updated value of the first cache block to the DRAM.

9. A processor comprising:
a first core to execute instructions of a first thread and having a first private cache associated therewith;
a second core to execute instructions of a second thread redundant to the first thread and having a second private cache associated therewith; and
a directory coupled to the first and second private caches to maintain cache coherency therebetween, wherein the directory is to allow both of the first and second private caches to maintain a first cache block in an exclusive state responsive to a determination that the first and second cores are to execute the redundant first and second threads, and to have exclusive concurrent access to the first cache block and to each write an updated value to a same portion of the first cache block in the corresponding first and second private caches, and otherwise to not allow the maintenance of the first cache block in the exclusive state for both of the first and second private caches, the directory to mark an entry for the first cache block to be in the exclusive state when the first cache block is provided to the first private cache and mark the entry to be in a shared-exclusive state when the first cache block is provided to the second private cache while the first cache block is stored in the first private cache, and to cause invalidation of the first cache block in the first and second private caches and to provide the first cache block in the exclusive state to a third private cache when a third core including the third private cache is to execute a non-redundant thread.

10. The processor of claim 9, wherein the first core includes a first buffer including a plurality of entries each to store information associated with a load operation, each entry including a senior indicator to indicate that the corresponding load operation has been committed.

11. The processor of claim 10, wherein the processor is to terminate redundant execution of the second thread and perform a re-synchronization when a snoop request matches an entry in the first buffer having a set senior indicator.

12. The processor of claim 10, wherein the first buffer is to maintain an entry after the corresponding load operation has committed and to set the senior indicator after the commitment, and to deallocate the entry after a corresponding load operation of the second thread for the same load data has committed.

13. The processor of claim 9, wherein the processor is, at retirement of an instruction, to determine whether the updated value to the same portion of the first cache block stored in the first private cache matches the updated value to the same portion of the first cache block stored in the second private cache, and if so, to write the first cache block having the updated value to a memory hierarchy.

14. The processor of claim 13, wherein the first core is to write the first cache block having the updated value to the memory hierarchy.

15. The processor of claim 13, wherein if the updated value to the same portion of the first cache block stored in the first private cache does not match the updated value to the same portion of the first cache block stored in the second private cache, the processor is to raise an exception.

\* \* \* \* \*